United States Patent [19]
Oliboni et al.

[11] Patent Number: 5,974,086
[45] Date of Patent: *Oct. 26, 1999

[54] METHOD AND APPARATUS IN A COMMUNICATION RECEIVER FOR ADJUSTING AN OPERATING ATTRIBUTE AT A PREDETERMINED BOUNDARY OF A PROTOCOL

[75] Inventors: Mark Oliboni, Boynton Beavch, Fla.; Mark Babcock, Austin, Tex.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/509,252

[22] Filed: Jul. 31, 1995

[51] Int. Cl.⁶ .............................. H04B 17/00; H04L 7/04
[52] U.S. Cl. ........................................... 375/225; 375/365
[58] Field of Search ..................................... 375/377, 224, 375/225; 340/825.44, 311.1, 825; 370/314; 455/38.1; 327/160

[56] References Cited

U.S. PATENT DOCUMENTS

| | | | |
|---|---|---|---|
| 5,111,486 | 5/1992 | Oliboni et al. | 375/376 |
| 5,168,493 | 12/1992 | Nelson et al. | 370/314 |
| 5,425,056 | 6/1995 | Maroun et al. | 375/316 |

OTHER PUBLICATIONS

Anselm Sequelra, "Circuit To Change Clock Speed Without Loss Of Timing", Motorola, Inc. Technical Developments Vol. 19 Jun. 1993, p. 122.

*Primary Examiner*—Chi H. Pham
*Assistant Examiner*—William Luther

[57] ABSTRACT

A method (600) that adjusts, at a predetermined boundary of a protocol utilized in decoding information from a signal received by a receiver (122), a symbol rate of the protocol (400). A processor (208) loads into a programmable counter (306), before a first boundary (412) of the protocol (400), a count of clock cycles defined to be received in the signal between the first and predetermined boundaries (414). The counter (306) counts from the first boundary (412), for a number of clock cycles equal to the count, a recovered bit clock synchronized with the signal and having the bit rate of the signal, to detect an occurrence of the predetermined boundary (414). The processor (208) loads, between the first (412) and predetermined boundaries (414), the another symbol rate into a bit-rate selection circuit (304). An output symbol rate of the bit-rate selection circuit (304) is enabled upon detecting the occurrence of the predetermined boundary (414), thereby adjusting the output symbol rate to the other symbol rate at the predetermined boundary (414).

4 Claims, 8 Drawing Sheets

METHOD AND APPARATUS IN A COMMUNICATION RECEIVER FOR ADJUSTING AN OPERATING ATTRIBUTE AT A PREDETERMINED BOUNDARY OF A PROTOCOL

FIELD OF THE INVENTION

This invention relates in general to communication receivers, and more specifically to a method and apparatus in a communication receiver for adjusting an operating attribute at a predetermined boundary of a communication protocol.

BACKGROUND OF THE INVENTION

With the advent of multi-speed paging protocols such as FLEX™, REFLEX™, and InFLEXion™ it is essential for clock generator circuits, utilized by message decoding devices operating within these protocols, to maintain glitch-free clock synchronization with the protocol during transitions in protocol speeds.

Thus, what is needed is a method and apparatus in a communication receiver for adjusting an operating attribute at a predetermined boundary of a communication protocol. In particular, the method and apparatus must maintain synchronization with the communication protocol in an error free manner.

DESCRIPTION OF THE PREFERRED EMBODIMENT

Figure 1:
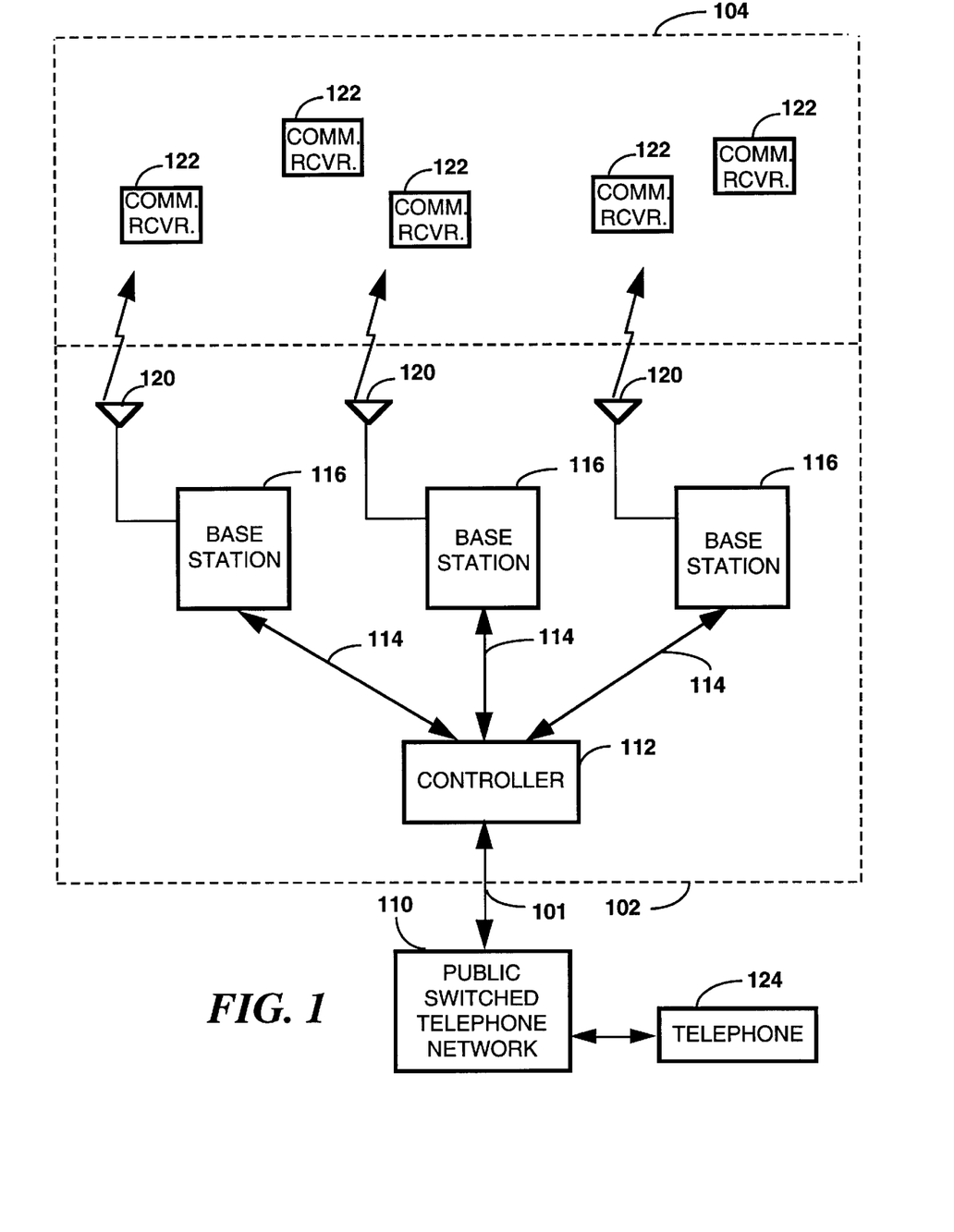
FIG. 1 is an electrical block diagram of a radio communication system in accordance with the preferred embodiment of the present invention.

Referring to FIG. 1, an electrical block diagram of a communication system in accordance with the preferred embodiment of the present invention comprises a fixed portion 102 and a portable portion 104. The fixed portion 102 includes a plurality of base stations 116, for communicating with the portable portion 104, utilizing conventional transmission techniques well known in the art, and coupled by communication links 114 to a controller 112 which controls the base stations 116. The hardware of the controller 112 is preferably a combination of the Wireless Messaging Gateway (WMG™) Administrator! paging terminal and the RF-Conductor!™ message distributor manufactured by Motorola, Inc. The hardware of the base stations 116 is preferably a Nucleus® Orchestra! transmitter manufactured by Motorola, Inc. It will be appreciated that other similar hardware can be utilized for the controller 112 and base stations 116.

Each of the base stations 116 transmits radio signals to the portable portion 104 comprising a plurality of communication receivers 122 via a transmitting antenna 120. The radio signals comprise selective call addresses and message transactions between the base stations 116 and the communication receivers 122. The controller 112 preferably is coupled by conventional telephone links 101 to a public switched telephone network (PSTN) 110 for receiving selective call messages therefrom. The selective call messages comprise voice and data messages received from the PSTN 110 using, for example, a conventional telephone 124 coupled to the PSTN 110 in a manner well known in the art.

Data and control transmissions between the base stations 116 and the communication receivers 122 preferably utilize an outbound protocol such as Motorola FLEX™ digital selective call signaling protocol described more fully in U.S. Pat. No. 5,168,493 issued Dec. 1, 1992 to Nelson et al., and assigned to the assignee of the present invention and which is hereby incorporated by reference. This protocol utilizes well-known error detection and error correction techniques and is therefore tolerant to bit errors occurring during transmission, provided that the bit errors are not too numerous in any one code word.

Transmissions comprising data and control signals from the base stations 116 preferably utilize two and four-level frequency shift keyed (FSK) modulation. It will be appreciated that other signaling protocols, modulation schemes, and transmission rates can be utilized as well.

Figure 2:
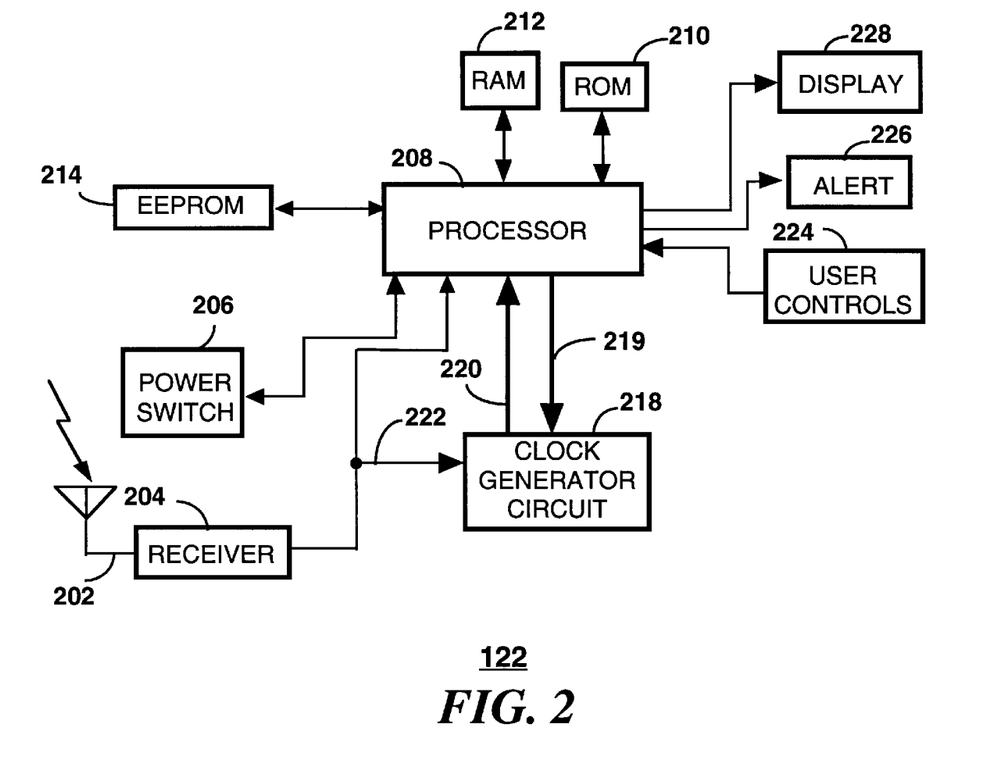
FIG. 2 is an electrical block diagram of a communication receiver utilized in the radio communication system of FIG. 1.

FIG. 2 is an electrical block diagram of the communication receiver 122 in accordance with the preferred embodiment of the present invention. The communication receiver comprises a receiver antenna 202 for intercepting RF signals from the base stations 116. The receiver antenna 202 is coupled to a receiver element 204 which includes a receiver utilizing conventional demodulation techniques for receiving the communication signal from the base station 116. The RF signals received from the base stations 116 use conventional two and four-level FSK. Radio signals received by the receiver element 204 produce demodulated information, which is coupled to a processor 208 and a clock generator circuit 218 for processing outbound messages.

During outbound message decoding the communication receiver 122 makes an adjustment to the clock generator circuit 218 in response to an operating attribute of the outbound protocol. The adjustment is made at an occurrence of a predetermined boundary of the outbound protocol. As a result, the clock generator circuit 218 generates clocks used by the processor 208, which maintain synchronization with the outbound message protocol.

A conventional power switch 206, coupled to the processor 208, is used to control the supply of power to the receiver element 204, thereby providing a battery saving function.

To perform the necessary functions of the communication receiver 122, the processor 208 is coupled to a random access memory (RAM) 212, a read-only memory (ROM) 210, and an electrically erasable programmable read-only memory (EEPROM) 214. Preferably, the processor 208 is similar to the M68HC08 micro-controller manufactured by Motorola, Inc. It will be appreciated that other similar processors can be utilized for the processor 208, and that additional processors of the same or alternative type can be added as required to handle the processing requirements of the processor 208. It will be also appreciated that other types of memory, e.g., EEPROM or FLASH, can be utilized for the ROM 210, as well as the RAM 212. It will be further appreciated that the RAM 212 and the ROM 210, singly or in combination, can be integrated as an integral portion of the processor 208.

The processor 208 is programmed by way of the ROM 210 to process incoming messages on the outbound channel. During outbound message processing, the processor 208 decodes in a conventional manner an address in the demodulated data of the outbound message, compares the decoded address with one or more addresses stored in the EEPROM 214, and when a match is detected, the processor 208 proceeds to process the remaining portion of the message.

Once the processor 208 has processed the message, it stores the message in the RAM 212, and a call alerting signal is generated to alert a user that a message has been received. The call alerting signal is directed to a conventional audible or tactile alerting device 226 for generating an audible or tactile call alerting signal.

The message can be accessed by the user through user controls 224, which provide functions such as lock, unlock, delete, read, etc. More specifically, by the use of appropriate functions provided by the user controls 224, the message is recovered from the RAM 212, and then displayed on a display 228, e.g., a conventional liquid crystal display (LCD).

Figure 3:
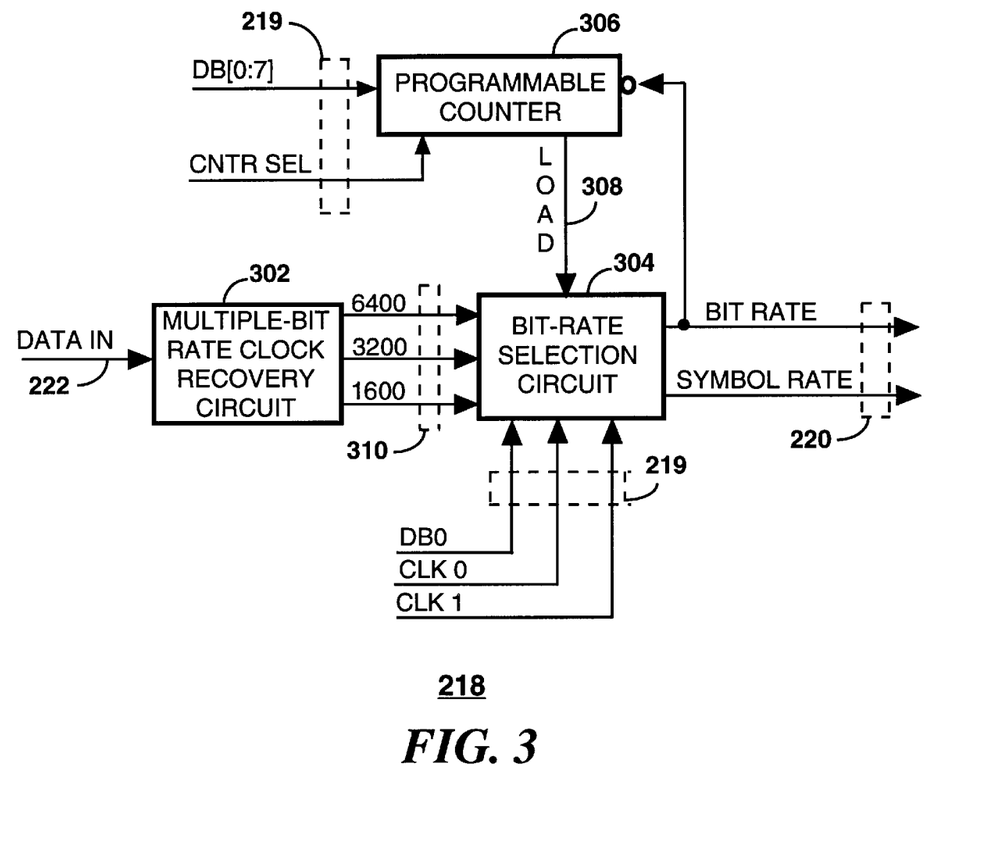
FIG. 3 is an electrical block diagram of the clock generator circuit utilized in the communication receiver of FIG. 2.

FIG. 3 is an electrical block diagram of the clock generator circuit 218 utilized in the communication receiver 122 of FIG. 2. The clock generator circuit 218 comprises a programmable counter 306, a multiple-bit rate clock recovery circuit 302, and a bit-rate selection circuit 304. The programmable counter 306 is preferably a conventional binary down counter triggered by an active-low clock edge. It will be appreciated that, alternatively, other conventional design techniques may be used such as a gray-code or Johnson counters. The multiple-bit rate clock recovery circuit 302 generates multiple-bit-rate clock signals which are synchronized with the communication signal received by the communication receiver 122. The multiple-bit rate clock recovery circuit 302 utilizes conventional techniques for recovering clocks 310 from the demodulated data (data in) 222 generated by the receiver element 204 of the communication receiver 122. The multiple-bit rate clock recovery circuit 302 is preferably functionally similar to the clock recovery circuit described more fully in U.S. Pat. No. 5,111,486 issued May 5, 1992 to Oliboni et al., and assigned to the assignee of the present invention and which is hereby incorporated by reference.

The clocks 310 comprise 6400Hz, 3200Hz, and 1600Hz square wave clocks. The clocks 310 are frequency and phase locked to the data in communications receiver 122, and are coupled to the input of the bit-rate selection circuit 304. Programming of the bit-rate selection circuit 304 is controlled by the processor 208 by way of a control bus 219 comprising a data bit 0 (DB0) signal line from the processor data bus, and two select lines (CLK0, and CLK1) generated by conventional decoding logic (not shown) coupled to the processor 208. The bit-rate selection circuit 304 is also coupled to the load signal 308 generated by the programmable counter 306.

The bit-rate selection circuit 304 generates a set of core clocks 220 delivered to the processor 208 for outbound message processing. The set of core clocks 220 comprise a bit rate clock and a symbol rate clock. The bit rate clock is coupled to both the processor 208 and the programmable counter 306.

The programmable counter 306 receives programming information from the processor 208 via the control bus 219. The control bus 219 further comprises a processor data bus (DB[0:7]), and a counter select signal (CNTR SEL) generated by the decoding logic. The programmable counter 306 is utilized for detecting an occurrence of the predetermined boundary of the outbound protocol as mentioned above.

The processor 208 is programmed by way of the ROM 210 for loading, prior to the first boundary of the outbound protocol, into the programmable counter 306, a preload count of bits defined by the outbound protocol received from the base station 116 between the first boundary and the predetermined boundary. The programmable counter 306 counts from the first boundary, for a number of clock cycles equal to the preload count, utilizing a recovered bit clock signal (bit rate clock) synchronized with the communication signal (outbound protocol) and having a bit rate corresponding to the bit rate of the communication signal, to detect the occurrence of the predetermined boundary.

The processor 208 is further programmed for loading, after the first boundary and before the predetermined boundary, the operating attribute into the bit-rate selection circuit 304 by way of the control bus 219. The operating attribute comprises a defined bit rate and symbol rate programmed into the bit-rate selection circuit 304. When the predetermined boundary is detected by the programmable counter 306, the programmable counter 306 generates the load signal 308 thereby enabling the bit-rate selection circuit 304 to control the core clocks 220 according to the operating attributes programmed by the processor 208.

Figure 4:
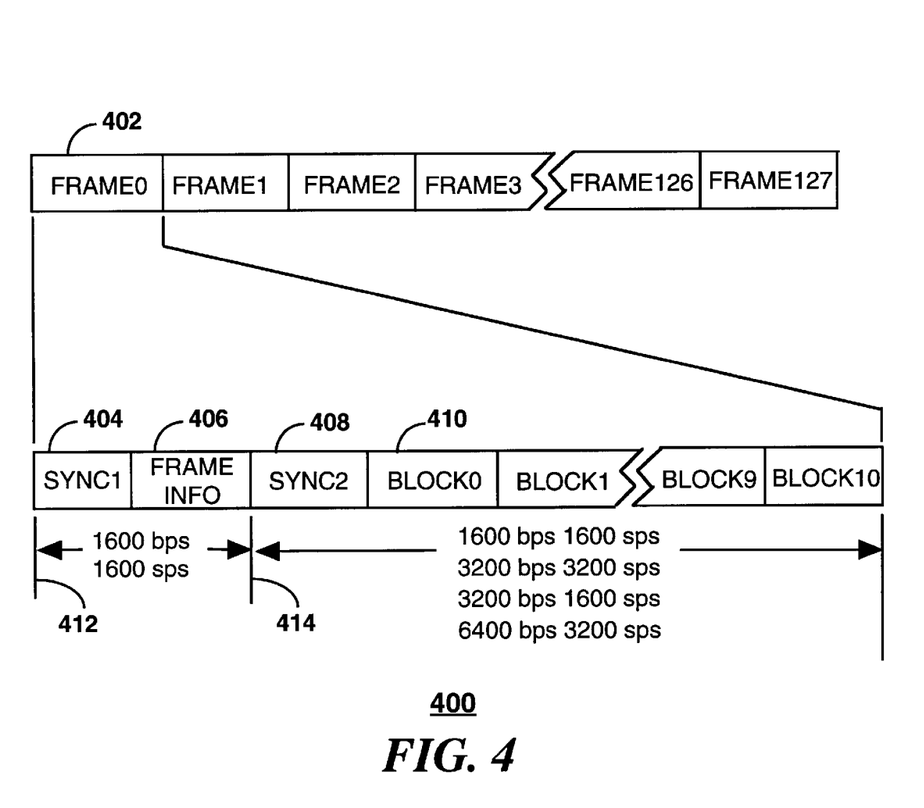
FIG. 4 is a timing diagram of a preferred communication protocol utilized by the radio communication system in accordance with the present invention.

FIG. 4 is a timing diagram of a preferred communication protocol 400 utilized by the radio communication system in accordance with the present invention. The outbound protocol comprises a plurality of frames 402 (one hundred and twenty eight shown by way of example). Each frame 402 includes a sync1 field 404, a frame info field 406, a sync2 field 408, and a plurality of blocks 410 (eleven blocks shown by way of example). The beginning of each frame 402 is depicted by a first boundary 412. The frame info field 406 and the sync2 field 408 are subdivided by a predetermined boundary 414. The predetermined boundary 414 defines a point in time when the bit-rate selection circuit 304 adjusts the core clocks 220 according to the operating attributes programmed by the processor 208.

As shown, between the first boundary 412 and the predetermined boundary 414 the core clocks operate at 1600 bits per second (bps) for the bit-rate clock and at 1600 symbols per second (sps) for the symbol rate clock. Upon transitioning beyond the predetermined boundary 414 the core clocks 220 can consist of one of four possible bit-rate and symbol rate clock combinations: (1) 1600 bps and 1600 sps, (2) 3200 bps and 3200 sps, (3) 3200 bps and 1600 sps, and (4) 6400 bps and 3200 sps.

Figure 5:
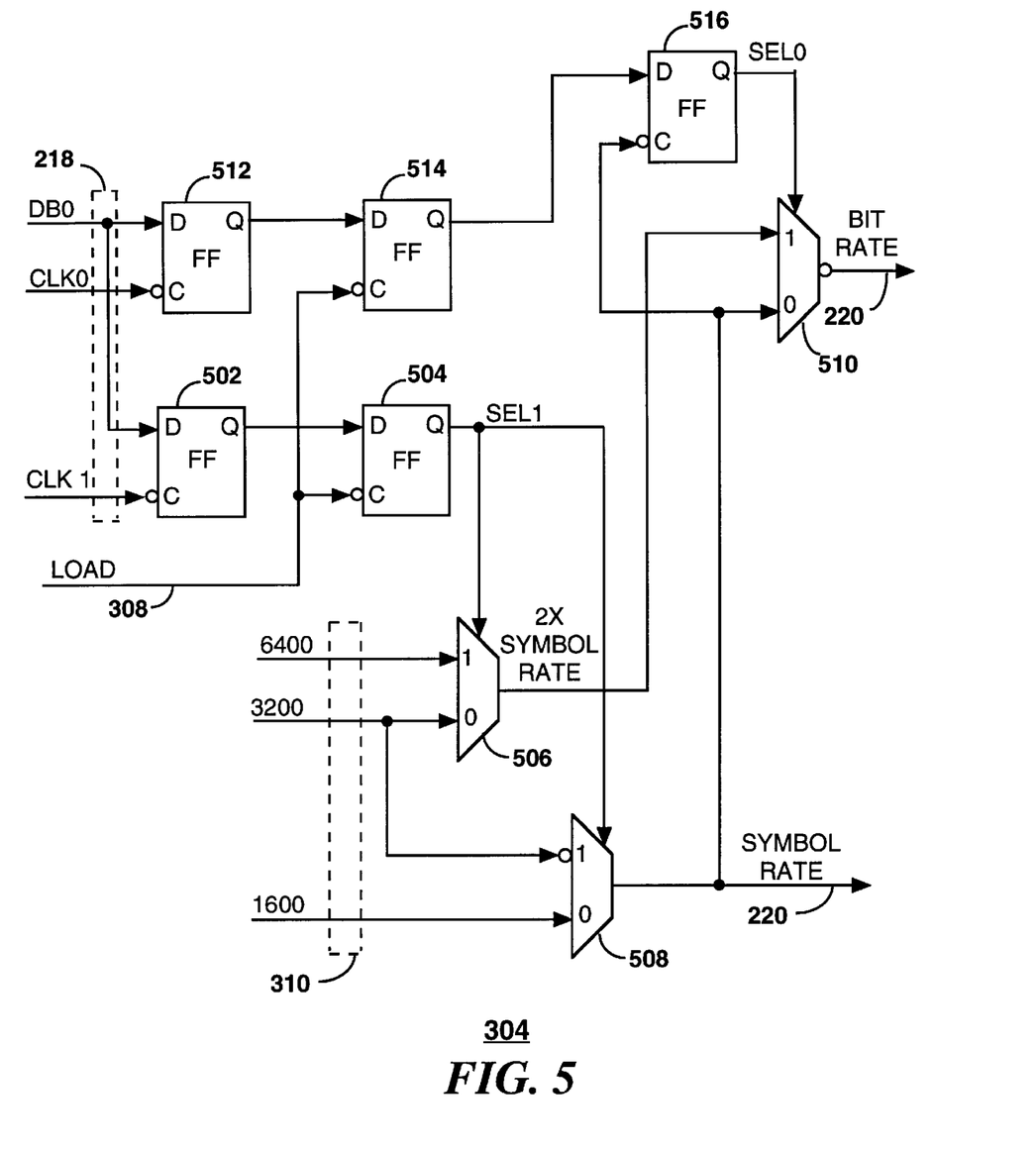
FIG. 5 is an electrical block diagram of the bit-rate selection circuit of FIG. 3.

FIG. 5 is an electrical block diagram of the bit-rate selection circuit 304 of FIG. 3. Conventional active-low clock flip-flops (FF) 512, 514, and 516 are used for programming the bit-rate clock selection by way of a conventional two-to-one inverting multiplexer 510 coupled to a 2× symbol rate clock signal and symbol rate clock signal generated by multiplexers 506 and 508, respectively. FF 512 receives programming attribute information from the processor 208 by way of the control bus 219. The data programmed into FF 512 is presented to FF 514 which samples the data upon receipt of the active-low load signal 308 generated by the programmable counter 306. The data programmed into FF 514 is presented to FF 516 which samples the data upon receipt of the active-low clock signal from the symbol rate clock.

Active-low clock FFs 502, and 504 are used for programming the selection of the 2× symbol rate clock and symbol rate clock by way the multiplexers 506 and 508, respectively. The multiplexer 506 is coupled to the 6400, and 3200 recovery clocks. While multiplexer 508 is coupled to an inverted 3200 recovery clock, and the 1600 recovery clock. FF 502 receives programming attribute information from the processor 208 by way of the control bus 219. The data programmed into FF 502 is presented to FF 504 which samples the data upon receipt of the active-low load signal 308 generated by the programmable counter 306. The operating attribute programmed into FF 504 controls both multiplexers 506 and 508. For this reason, the 2× symbol rate clock and the symbol rate clock are programmed to one of two configurations: 6400Hz and 3200Hz, and 3200Hz and 1600Hz for multiplexers 506 and 508, respectively.

The operating attribute, which comprises a defined number of bits corresponding to the bit-rate clock and symbol rate clock, defines four possible configurations for the bit-rate selection circuit 304. The four configurations for the bit rate clock and the symbol rate clock, respectively, are 1600 bps and 1600 sps (2-level FSK), 3200 bps and 3200 sps (2-level FSK), 3200 bps and 1600 sps (4-level FSK), and 6400 bps and 3200 sps (4-level FSK). The corresponding binary operating attributes (SEL0 and SEL1) for the bit-rate clock and symbol rate clock configurations are the sequences 00, 01, 10, and 11.

FIGS. 6, 7, 8, and 9 are timing diagrams of four core clock 220 transitional diagrams taking place at the predetermined boundary 414 (which is represented by time boundary 518) of the communication protocol 400 utilized by the radio communication system. Each timing diagram includes symbol data input (SYMBOL DATAIN) received from the receiver 204, sampled symbol information (CAPTURED SYMBOL), and sampled data bits (CAPTURED BIT). As was described for the communication protocol 400 of FIG. 4 the sync1 field 404 and frame info field 406 operate at a bit-rate clock of 1600 bps, and a symbol rate clock of 1600 sps. At the predetermined boundary 414, which is at the point in time when the load signal 308 from the programmable counter 306 is active, one of the four core clock configuration transitions described above take place.

Figure 6:
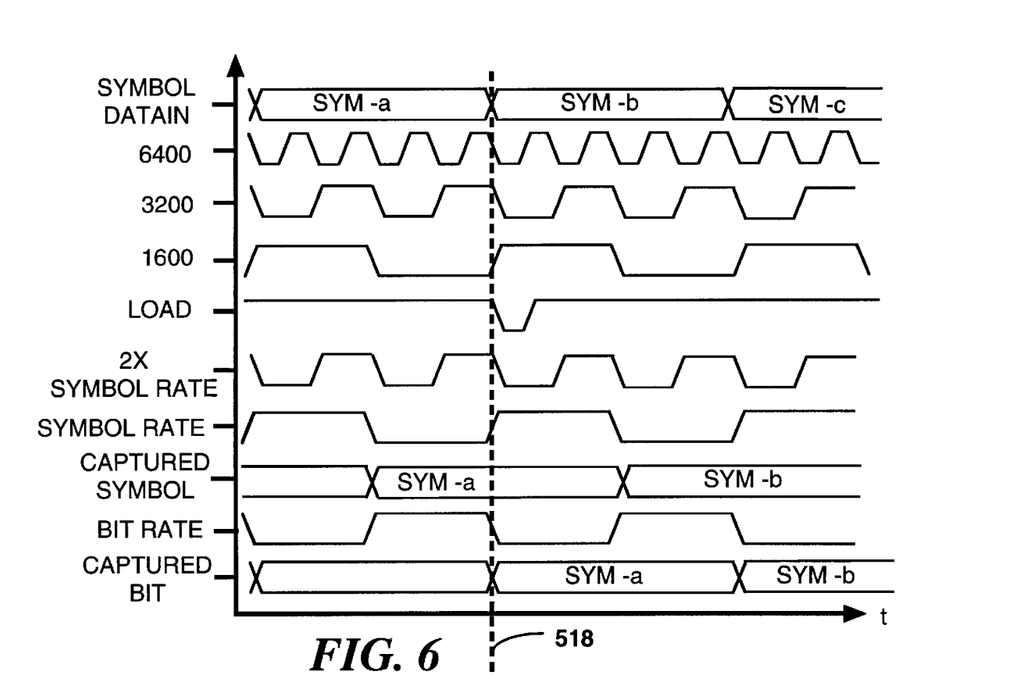
FIGS. 6, 7, 8, and 9 are timing diagrams of four core clock transitional diagrams taking place at the predetermined boundary of the communication protocol utilized by the radio communication system.

FIG. 6 illustrates the core clock 220 transition, at the predetermined boundary 414, for the configuration 1600 bps and 1600 sps (bit sequence SEL0, SEL1=00). Since the initial state of the bit-rate clock and symbol rate clock are at 1600 bps and 1600 sps, respectively, and the bit-rate selection circuit 304 programming remains unchanged, there are no transitional changes (i.e., the symbol and bit rate clocks remain unchanged) during the transition boundary 518. As shown, captured symbols and captured bits are staggered by half a clock cycle of the 3200 clock. This is due to sampling input data on the falling edge of the symbol and bit rate clocks, respectively.

Figure 7:
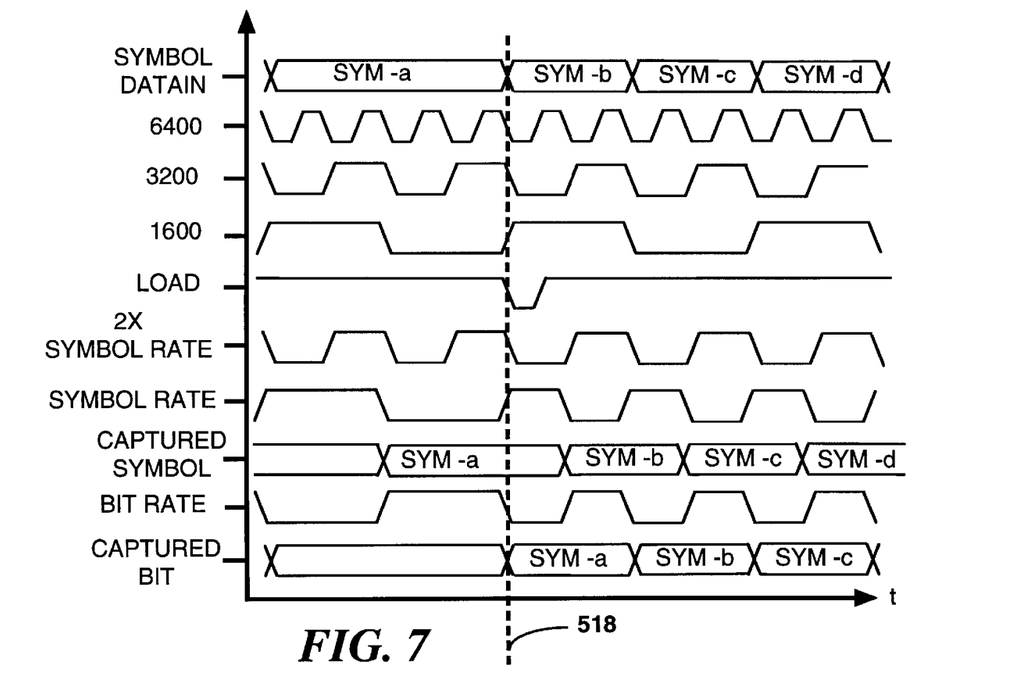

FIG. 7 illustrates the core clock 220 transition, at the predetermined boundary 414, for the configuration 3200 bps and 3200 sps (bit sequence SEL0, SEL1=01). At the transition boundary 518 the falling edge of the load signal 308 causes the bit-rate selection circuit 304 to enable the transition of the core clocks 220 to the new operating attribute programmed by the processor 208. Note during the transition boundary 518, multiplexer 508 is programmed to select input 1, that is, the inverted 3200 recovery clock, and multiplexer 510 is programmed to select input 0, that is, the symbol rate clock. Since the 3200 recovery clock is inverted by multiplexers 508 and 510, the bit rate clock generates the original 3200 recovery clock with a marginal gate delay.

For the symbol rate clock, switching from the 1600 recovery clock to the 3200 recovery clock is glitchless, because the 3200 recovery clock is inverted thereby transitioning from low-to-high the same as the 1600 recovery clock. Therefore, switching the select line of multiplexer 508 from input 0 to input 1 is a glitchless operation. The programming of multiplexer 510 follows changes in multiplexer 508 which generates the symbol rate clock. For this reason, the bit rate clock is also glitchless for this configuration.

Figure 8:
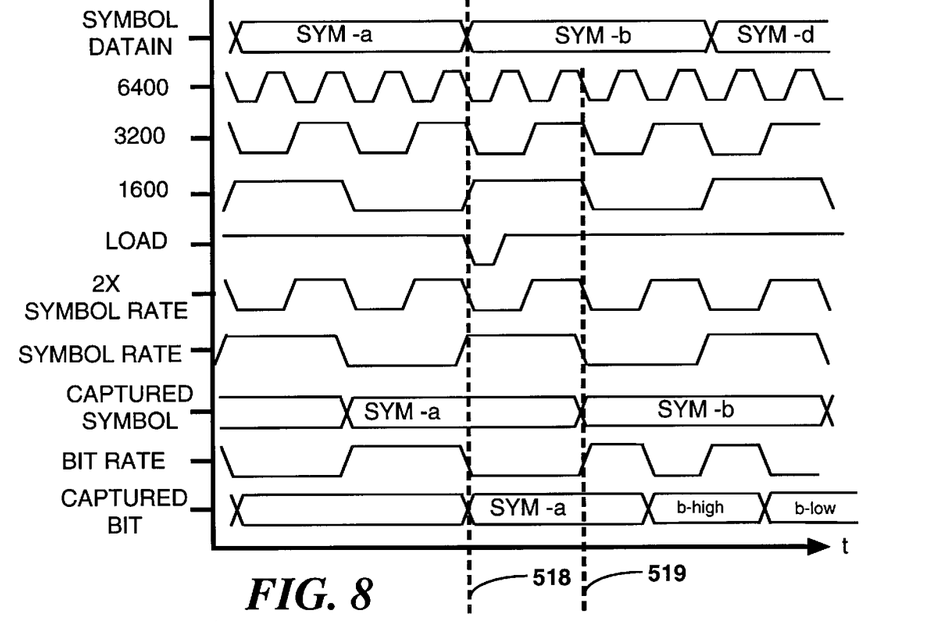

FIG. 8 illustrates the core clock 220 transition, at the predetermined boundary 414, for the configuration 3200 bps and 1600 sps (bit sequence SEL0, SEL1=10). At the transition boundary 518 the falling edge of the load signal 308 causes the bit-rate selection circuit 304 to enable the transition of the core clocks 220 to the new operating attribute programmed by the processor 208. In this configuration only multiplexer 510 is updated. The symbol rate clock remains unchanged after the transition boundary 518. Since FF 516 is clocked by the symbol rate clock, multiplexer 510 is not updated with the new operation attribute until the falling edge of the symbol rate clock. At boundary 519 multiplexer 510 receives the unadulterated 3200 recovery clock from multiplexer 506 on input 1 which is transitioning from high-to-low. Input 0 is receiving the 1600 recovery clock which similarly is transitioning from high-to-low at the boundary 519. For this reason, when multiplexed 510 is updated from input 0 to input 1 a glitchless transition occurs. Note the purpose of FF 516 is to delay updating multiplexer 510 so that the captured symbols (2 bits per symbol) can be sampled serially by the bit rate clock at the middle of the low and high clock states of the symbol rate clock, thereby generating bits b-high, b-low, etc.

Figure 9:
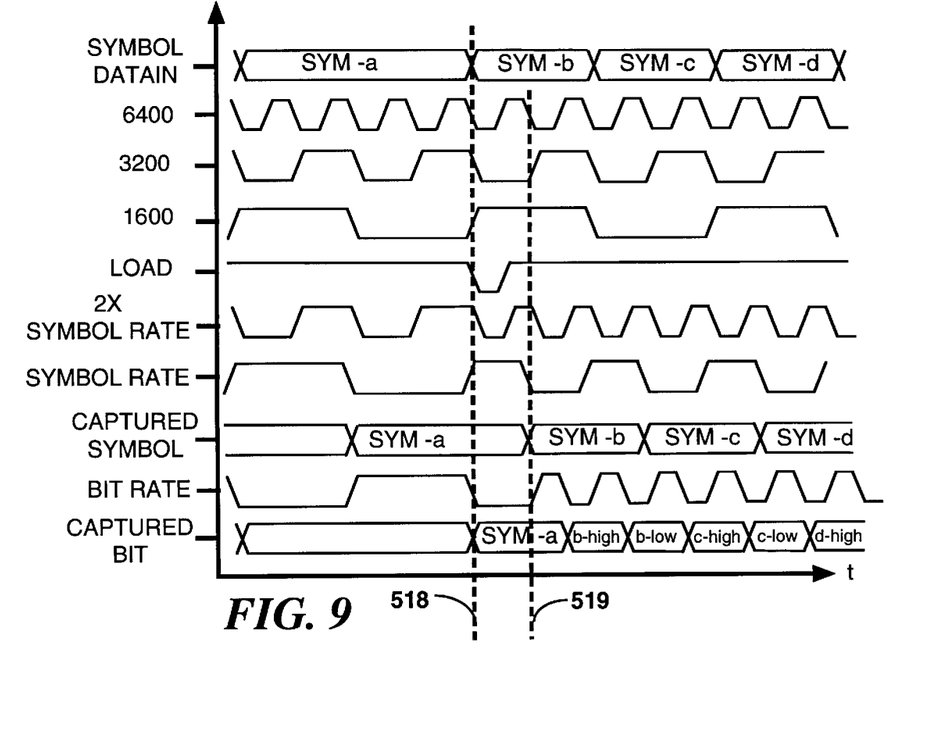

FIG. 9 illustrates the core clock 220 transition, at the predetermined boundary 414, for the configuration 6400 bps and 3200 sps (bit sequence SEL0, SEL1=11). At the transition boundary 518 the falling edge of the load signal 308 causes the bit-rate selection circuit 304 to enable the transition of the core clocks 220 to the new operating attribute programmed by the processor 208. In this configuration both multiplexers 508 and 510 are updated. The symbol rate clock switches to input 1 in the same manner as described for FIG. 7. As described for FIG. 8, FF 516 is not updated with the new operation attribute until the falling edge of the symbol rate clock. At boundary 519 multiplexer 510 receives the 6400 recovery clock from multiplexer 506 on input 1 which is transitioning from high-to-low. Input 0 is receiving the 1600 recovery clock which in a high clock state. When multiplexed 510 is updated from input 0 to input 1 a glitchless transition occurs from low-to-high on the bit rate clock. Note, as described in FIG. 8, FF 516 delays the updating of multiplexer 510 so that the captured symbols can be sampled at the middle of the low and high clock states of the symbol rate clock, thereby generating bits b-high, b-low, c-high, etc.

Figure 10:
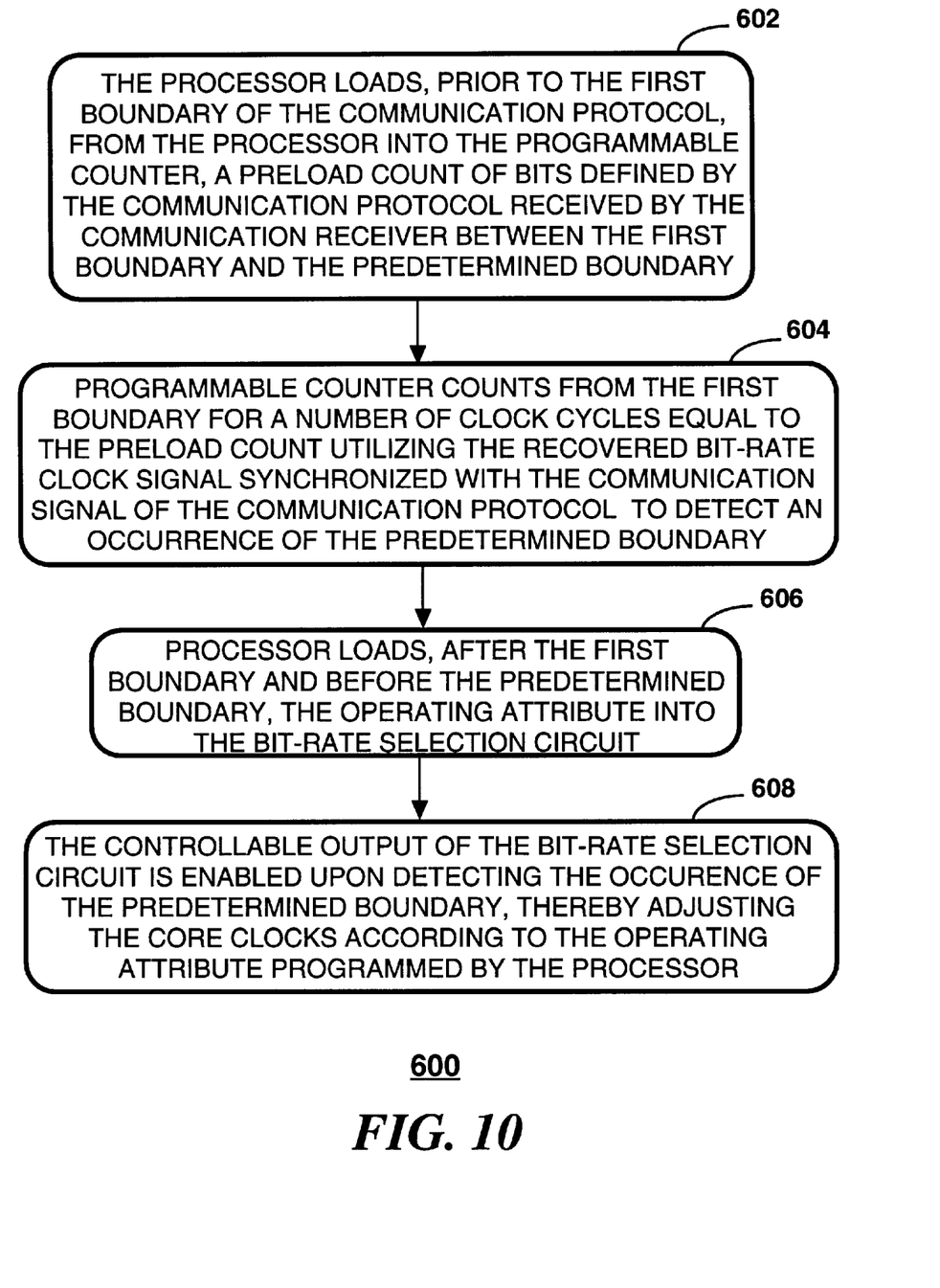
FIG. 10 is a flow chart depicting operation of the clock generation circuit during reception of the communication protocol by the communication receiver in accordance with the preferred embodiment of the present invention.

FIG. 10 is a flow chart depicting operation of the clock generation circuit during reception of the communication protocol 400 by the communication receiver 122 in accordance with the preferred embodiment of the present invention. The flow chart begins with step 602 where the processor loads, prior to the first boundary 412 of the communication protocol 400, from the processor 208 into the programmable counter 306, a preload count of bits defined by the communication protocol 400 received by the communication receiver 122 between the first boundary 412 and the predetermined boundary 414. In step 604 the programmable counter 306 counts from the first boundary 412 for a number of clock cycles equal to the preload count utilizing the recovered bit-rate clock signal synchronized with the communication signal of the communication protocol 400 to detect an occurrence of the predetermined boundary 414. In step 606 the processor 208 loads, after the first boundary 412 and before the predetermined boundary 414, the operating attribute into the bit-rate selection circuit 304. In step 608 the controllable output of the bit-rate selection circuit 304 is enabled upon detecting the occurrence of the predetermined boundary 414, thereby adjusting the core clocks 220 according to the operating attribute programmed by the processor 208.

Thus, it should be apparent by now that the present invention provides a method and apparatus in the communication receiver 122 for adjusting an operating attribute at the predetermined boundary 414 of the communication protocol 400. In particular, the method and apparatus advantageously provides a novel method for adjusting the core clocks 220 in a glitchless manner, thereby preventing inadvertent loss or corruption of data during the core clock transition at boundary 414. In adboundary 414. In addition, the method and apparatus advantageously can be extended to higher or lower synchronous frequency protocols utilizing data rates such as 12800 bps, 15600 bps, 31200 bps, etc.

What is claimed is:

1. A method of adjusting a symbol rate of a symbol rate clock in a communications receiver, the symbol rate clock utilized in decoding information from a communication signal received by the communication receiver, the communication signal changing symbol rates at a predetermined boundary of a protocol, the adjusting made at an occurrence of the predetermined boundary of the protocol, wherein the communication receiver comprises a processor, a programmable counter, and a bit-rate selection circuit having a controllable symbol rate output, the method comprising the steps of:

while the communications receiver is decoding information from the communication signal at one symbol rate, loading, prior to an occurrence of a first boundary of the protocol, from the processor into the programmable counter, a preload count of bits defined by the protocol;

while the communications receiver is decoding information from the communication signal at one symbol rate, counting after the occurrence of the first boundary by the programmable counter, for a number of clock cycles equal to the preload count, a recovered bit clock signal synchronized with the communication signal and having a bit rate corresponding to the bit rate of the communication signal, to detect an occurrence of the predetermined boundary;

while the communications receiver is decoding information from the communication signal at one symbol rate, loading, after the occurrence of the first boundary and before the occurrence of the predetermined boundary, another symbol rate from the processor into the bit-rate selection circuit; and enabling the controllable symbol rate output of the bit-rate selection circuit upon detecting the occurrence of the predetermined boundary, thereby adjusting the symbol rate clock in the communications receiver to the other symbol rate for decoding information from the communication signal at the other symbol rate subsequent to the occurrence of the predetermined boundary of the protocol.

2. The method of claim 1, wherein the communication receiver includes a multiple-bit-rate clock recovery circuit synchronized with the communication signal for generating multiple-bit-rate clock signals therefrom, and wherein the method further comprises the step of generating the recovered bit clock signal from the multiple-bit-rate clock recovery circuit operating in cooperation with the bit-rate selection circuit.

3. The method of claim 2, wherein the generating step comprises the step of maintaining synchronization of the recovered bit clock signal with the communication signal and maintaining the bit rate corresponding to the bit rate of the communication signal, after the operating attribute is adjusted, without requiring a resynchronization of the recovered bit clock signal.

4. The method of claim 2, further comprising in the communication receiver the step of generating a recovered symbol clock signal synchronized with the communication signal and having a symbol rate corresponding to the symbol rate of the communication signal.

* * * * *